United States Patent [19]
McIntyre

[11] Patent Number: 5,671,246
[45] Date of Patent: Sep. 23, 1997

[54] METHOD AND APPARATUS FOR ADAPTIVE ADJUSTMENT OF CACHE ALLOCATION FOR STORAGE OF FONT DATA

[75] Inventor: C. Kevin McIntyre, Boise, Id.

[73] Assignee: Hewlett-Packard Comany, Palo Alto, Calif.

[21] Appl. No.: 636,458

[22] Filed: Apr. 22, 1996

[51] Int. Cl.$^6$ .................................................. G06K 15/00
[52] U.S. Cl. ........................................ 375/115; 375/110
[58] Field of Search .................................... 395/114, 115, 395/116, 164, 165, 166, 110, 167, 168, 171, 501, 507, 508, 511, 514; 358/404, 444, 467, 261.4, 470

[56] References Cited

U.S. PATENT DOCUMENTS 4,907,094  3/1990  Mishima et al. ..................... 358/404

FOREIGN PATENT DOCUMENTS

0562558A1  9/1996  European Pat. Off. ............... 395/115

*Primary Examiner*—Arthur G. Evans

[57] ABSTRACT

A computer downloads rasterized font characters to a connected printer and employs a method which enables a rendering of large character sets by the printer, even though the printer is not designed to internally handle such large character sets. The method enables the computer to control allocations of memory in the printer for storage of font data. Initially, the computer arranges for the printer to allocate an initial portion of memory for storage of font data. A printer driver within the computer then analyzes data segments to be sent to the printer to determine if a respective data segment is text-related data; graphics-related data or raster data. If it is determined that text-related data is to be sent to the printer, it is next determined if the printer stores font data to enable a printing of a character designated by a current character-defining data segment. If the printer does not store the necessary character, the method causes, if necessary, the printer to allocate further memory for storage of the additional font data to be supplied by the computer. The computer further controls the printer to revise the portion of memory allocated for the storage of font data, if either graphics-related data or raster data is being sent to the printer.

5 Claims, 2 Drawing Sheets

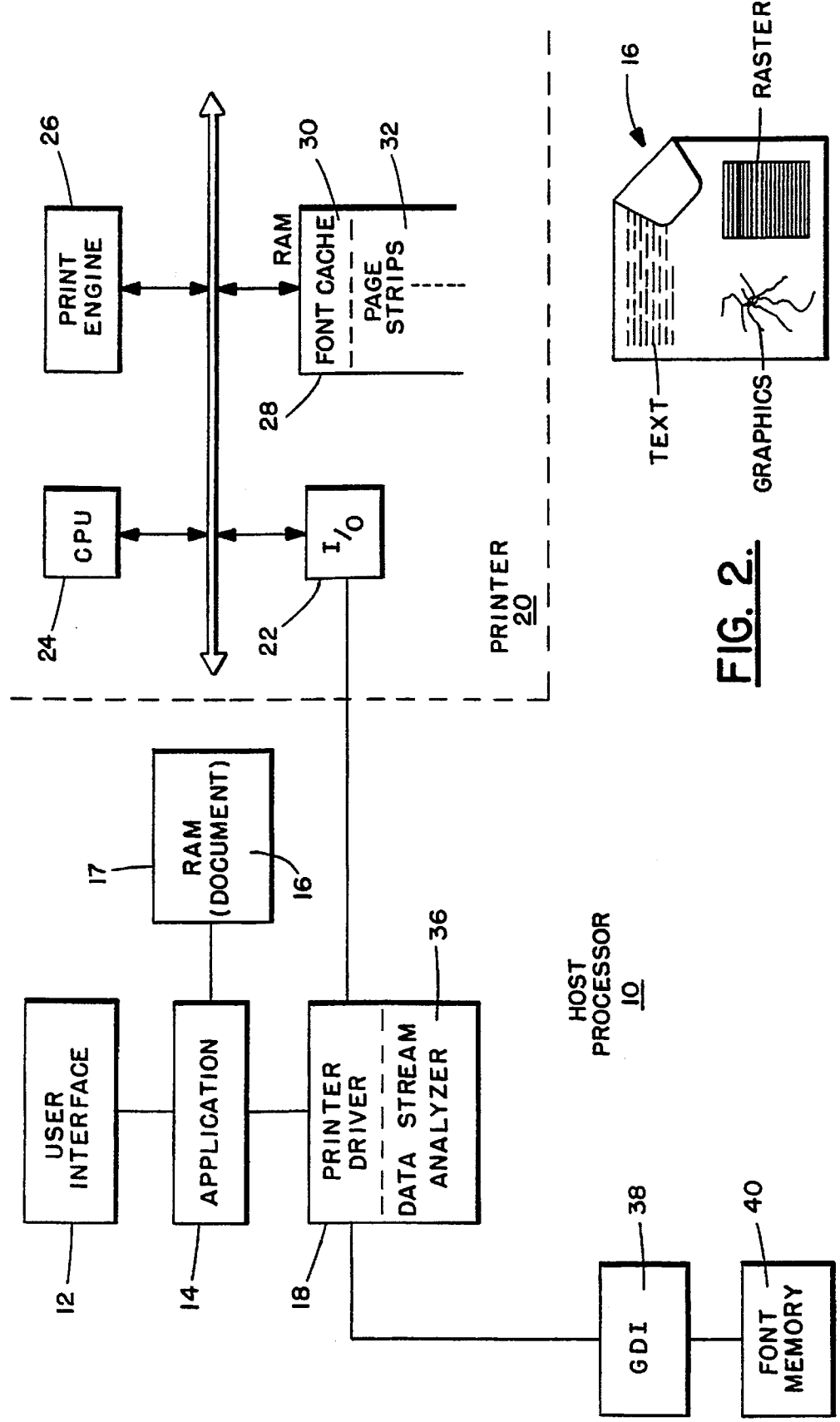

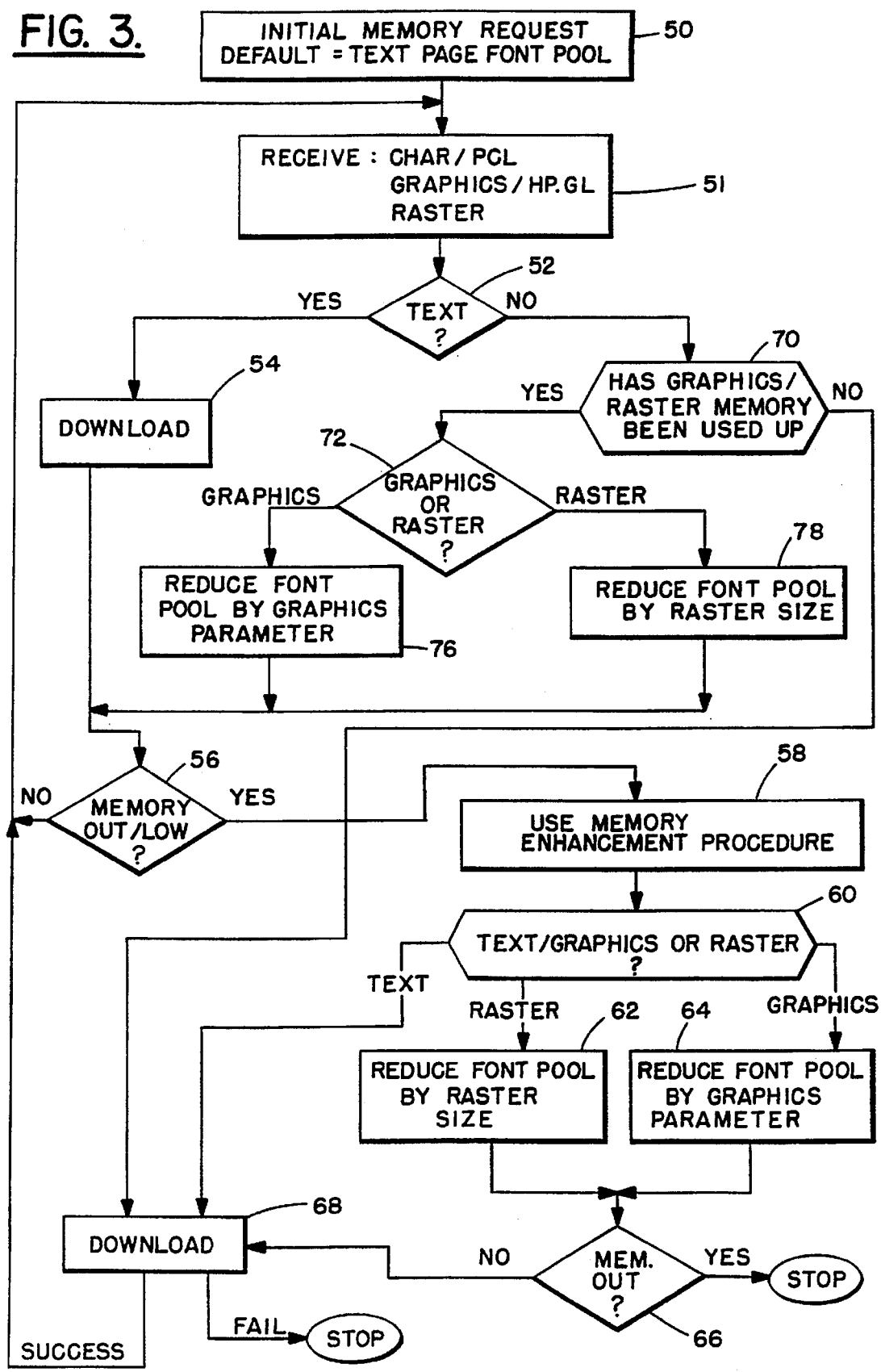

METHOD AND APPARATUS FOR ADAPTIVE ADJUSTMENT OF CACHE ALLOCATION FOR STORAGE OF FONT DATA

FIELD OF THE INVENTION

This invention relates to text-based printers and, more particularly, to a method and apparatus for enabling a computer to control an amount of cache memory in a printer which is allocated for the storage of font data.

BACKGROUND OF THE INVENTION

Present day ink jet and laser-based printers have the capability of producing text that exhibits many different font representations. The rendering of an image on such a print mechanism requires the formation of a raster image at some point in the printing process. In the case of font characters, a raster bitmap of each needed character can be stored in memory and then copied from memory to the print mechanism whenever the character is required. A complete set of characters can be maintained in memory, but this requires the storage of each particular character in every needed point size, resolution and characteristic (e.g., bold, italic, etc.), a solution which is not feasible. Alternatively, a character set can be encoded to allow for a conversion into a bitmap exhibiting a particular character size and resolution that is appropriate for a selected device. Characters to be reused can be stored in a cache memory to facilitate faster printing.

Typically, printer memories can accommodate a small number of bitmap fonts, enough for a small job. When a job requires a large number of fonts or point sizes, the capacity of the printer's cache memory can be exceeded, requiring some character bitmaps stored therein to be regenerated multiple times.

The well-known Windows operating system (a Trademark of the Microsoft Corporation) includes a "graphics device interface" (GDI) which responds to requests for individual characters by returning to the requesting entity, the requested character's bitmap. The bitmap is then stored in the host processor and transferred to the printer for storage in the font cache.

A variety of printers have been designed to handle Latin fonts which exhibit a limited number of individual characters. In general, such printers represent each font character through the use of an 8 bit byte. Thus, if such a printer employs the Windows operating system with the graphics device interface, the 8 bit byte fed to GDI will enable the return of the requested raster-arranged font character. In order to enable such printers to handle larger fonts, such as those commonly found in Asia, at least 2 bytes are required to identify all required characters from the font.

Because printers that were initially designed to handle Latin fonts are only adapted to handle single byte character identifiers, such printers are not capable of receiving dual byte identifiers and performing the necessary identification/ rasterization of a locally stored font character. That function is thus handled by the host processor. The host processor converts the dual byte identifier into a raster image of the character, which is then transferred to the printer for rendering on the page.

As the downloading of rasterized font data from the host processor to the printer is a fairly slow process, a method has been developed to enable rasterized font characters to be cached in both the printer and the host processor so as to reduce the amount of required data transfers. U.S. patent application Ser. No. 08/572,260 entitled "Using both a Host Cache and a Printer Cache to Improve Text Printing Performance" to Weyand et al., and assigned the same Assignee as this Application, describes such an innovation. Briefly stated, Weyand et al. rasterize a needed character in the host processor; send the rasterized font data to the printer while maintaining a copy in the host processor. If the printer, during page processing, experiences a memory low or memory out condition which requires a flushing of the cache to render more memory available, the rasterized character/ characters are still available on the host processor and can be transferred to the printer, as needed. Thus, the need to re-rasterize a character that was flushed is avoided.

The Weyand et al. invention enables the user to define different printer states, each with an associated static cache memory size. The selected printer state is based entirely upon the user's understanding of the page to be printed and is not based upon the internals of the printer itself or the type of page actually being printed. If the state is incorrectly set by the user, there is either too much or too little memory allocated for the caching of font data. Under such circumstances, a premature cache memory shortage may occur or too much memory may be allocated which could otherwise be used for other printing needs.

Accordingly, it is an object of this invention to provide an improved method for allocation of cache memory in a printer.

It is a further object of the invention to provide a cache memory allocation procedure wherein the allocation can be adaptively altered in accordance with a determined type of page or page portion that is to be printed.

It is another object of this invention to enable on-line re-allocation of cache memory in a printer in accordance with various classifications of data being sent to the printer for rendering.

SUMMARY OF THE INVENTION

A computer downloads rasterized font characters to a connected printer and employs a method which enables a rendering of large character sets by the printer, even though the printer is not designed to internally handle such large character sets. The method enables the computer to control allocations of memory in the printer for storage of font data. Initially, the computer arranges for the printer to allocate an initial portion of memory for storage of font data. A printer driver within the computer then analyzes data segments to be sent to the printer to determine if a respective data segment is text-related data; graphics-related data or raster data. If it is determined that text-related data is to be sent to the printer, it is next determined if the printer stores font data to enable a printing of a character designated by a current character-defining data segment. If the printer does not store the necessary character, the method causes, if necessary, the printer to allocate further memory for storage of the additional font data to be supplied by the computer. The computer further controls the printer to revise the portion of memory allocated for the storage of font data, if either graphics-related data or raster data is being sent to the printer.

DESCRIPTION OF THE DRAWINGS

FIG. 1 is a block diagram of a system that embodies the invention hereof.

FIG. 2 is a showing of a media sheet having text, graphics and a raster image.

FIG. 3 is a logical flow diagram illustrating the method of the invention.

DETAILED DESCRIPTION OF THE INVENTION

Referring to FIG. 1, a host processor 10 includes a user interface 12 which, in combination with an application 14, enables the creation of a document 16 that is stored in random access memory (RAM) 16. An example of document 16 is shown in FIG. 2 and may include only text, only graphics or only a raster image, or any combination thereof.

A printer driver 18, under control of user interface 12 and application 14, provides print data to a connected printer 20 via I/O interface 22. Printer 20 further includes a central processing unit 24, a print engine 26 and a random access memory (RAM) 28. Within RAM 28 is an area 30 designated for the storage of rasterized font characters and an area 32 for the storage of portions of a page (i.e. "page strips") to be rendered into a raster image for printing by print engine 26. Further areas of RAM 28 are allocated to other printer functions, but are not shown in the FIG. 1.

When printer driver 18 (within host processor 10) receives, via application 14, a document to be printed, the incoming data is analyzed by data stream analyzer 36 to determine the "character" of the data. In other words, if an incoming data segment is determined to be a font character code, printer driver 18 responds by instructing graphic device interface (GDI) 36 to access a required font character from font memory 40. GDI 38 rasterizes the accessed font character and provide the rasterized character back to printer driver 18. Thereafter, printer driver 18 dispatches the rasterized font character to printer 20, where the rasterized font character is stored in font cache memory area 30.

To this point, the structure and operation of the host processor/printer arrangement of FIG. 1 are substantially similar to that disclosed in the Weyand et al. patent application, referred to above. However, Weyand et al. control the size of font cache 28 by a user input through user interface 12. Thereafter, the size of font cache area 30 remains unchanged during further processing of a page.

This invention enables the size of font cache 28 to be adaptively altered during processing of a page in accordance with (1) the amount of memory required to store new font characters; (2) the amount of memory required to accommodate graphics data (if any) and (3) the amount of memory required to enable storage of a raster image to be included in the page rendering (if any). Such adaptive memory allocation is carried out in conjunction with data stream analyzer 36 in host processor 10.

Hereafter, the operation of the operation of the system of FIG. 1 will be described in a summary fashion, followed by a more detailed description using the flow diagram of FIG. 3.

Initially, the user, via interface 12 and application 14, produces a document which is stored in RAM 16. When the document is ready for printing, the user, via user interface 12, causes application 14 to invoke printer driver 18, which then issues a print job request. Printer driver 18 instructs printer 20 to make an initial memory allocation for the caching of font characters in RAM 28 (i.e., for use as font cache area 30). The initial assumption is that the document to be provided will be text-based and the size of font cache 30 is set by a parameter which has been previously entered into data stream analyzer 36. Thus, data stream analyzer 36 is fully aware of the size of font cache area 30 within printer 20. It is preferred that the initial allocation of memory as font cache area 30 be sufficient to accommodate the needs of a text-only page.

In response to the memory allocation request from printer driver 18, printer 20 acknowledges a successful allocation back to printer driver 18, thereby enabling the print job action to proceed. Thereafter, printer driver 18 begins, in combination with application 14, accessing data segments from the document stored in RAM 16. As each data segment is accessed, it is analyzed by data stream analyzer 36 to determine whether it is indicative of a font character, a graphics command, or a raster image.

Data stream analyzer 36 performs the analysis by examining the incoming data to determine if received commands are indicative of, for instance, Printer Control Language (PCL) which generally is used for encoded alphanumeric text. If the incoming data is configured in the form of HP/GL, a graphics language, then it is determined that graphics data is being received. If a header is received indicating that a raster image is to follow, then, obviously, it is determined that raster data is incoming. A raster image header will generally indicate the size of the raster image, thereby enabling data stream analyzer 36 to output a font cache size change command that is in accordance with the size of the to-be-received raster image.

Once data stream analyzer 36 analyzes the incoming data stream and renders a decision on each received data segment—as to whether it is indicative of text; graphics or a raster image; the following procedure occurs. If the incoming data segment is indicative of a font character and that font character is not present in printer 20, data stream analyzer 36 accesses, from font memory 40, the required font character (via GDI 38). Data stream analyzer 36 then examines the size of font cache area 30 and determines whether it is large enough to store the required font character. If yes, printer driver 18 passes the rasterized character to printer 20 for transmission to printer 20.

If, however, there is insufficient room in font cache area 30 for storage of the new font character, data stream analyzer 36 causes printer driver 18 to output a command to printer 20 to increase the size of font cache area 30, accordingly. Upon receiving an acknowledgment of an increased allocation of cache size, printer driver 18 is thereafter enabled to transmit the additional font character raster data and to continue transmitting the document data from RAM 16.

At the same time, data stream analyzer 36 updates its record of the amount of memory presently allocated for font cache area 30.

Thereafter, if data stream analyzer determines that an incoming data segment is indicative of a graphics command, data stream analyzer 36 causes printer driver 18 to transmit a command to printer 20 to de-allocate a portion of the memory allocated to font cache area 30 and to re-allocate that memory for use as storage for the to-be received graphics image. To the extent that such action may require certain of the font characters within font cache area 30 to be removed, a least recently used protocol (or another equivalent protocol) is utilized to determine which characters are to be flushed.

Similarly, if incoming data from the document is determined to comprise a raster image, data stream analyzer 38 causes printer driver 18 to output a command to printer 20 to de-allocate a portion of font cache area 30 and to re-allocate that portion to the storage of the raster image. Since the raster image is accompanied by header data which designates the size of the raster image, that size can be utilized to specify the amount of memory allocated for storage of the raster image. At all times, data stream analyzer 38 keeps track of the amount of currently allocated memory in font cache area 30; that portion of the allocated font cache area 30 which is occupied by font data and, further, the specific font characters that are stored therein.

It is to be understood that in some cases a request for additional cache memory cannot be satisfied, because all of the memory is in use. In such case, the request is either not issued, or a failure occurs as a result of the attempted allocation. If the allocation is successful, then font characters are continually added to the cache. Once a page is completed, the conventional (non-font cache memory) is freed back to the system. The font cache is retained because, typically, font characters are consistently utilized between pages (i.e., a user does not delete or change fonts on a page-by-page basis).

As can thus be seen, the invention enables the dynamic allocation of cache memory for font storage purposes, as it is needed. The cache size is increased or decreased in accordance with the amount of font characters and/or graphics and/or raster image data that is received. This action enables the printer to access memory capacity which might not otherwise be available, if it had been pre-allocated and then not used.

Turning now to FIG. 3, the flow diagram which illustrates the operation of the system of FIG. 1 will be further described. As above indicated, printer driver 18, upon receiving a print job request, issues a command to printer 20 to allocate an initial pool of memory for font cache area 30 (box 50). That allocation is based upon the assumption that a text page will be received and the amount of memory is determined by a stored parameter which acts as the default font pool allocation value. Thereafter, data stream analyzer 38 begins to receive and analyze the incoming data segments from RAM 16 (box 51). If, as shown by decision box 52, it is determined that an incoming data segment is text, a download action (box 54) is commanded to printer driver 18 which then transmits the data segment to printer 20. It is next determined if there is a memory out or low condition in font cache area 30 (decision box 54). If no, the process recycles, and awaits a next data segment.

If by contrast, decision box 56 determines that there is insufficient memory in font cache area 30, a command is generated to printer 20 to institute a memory enhancement procedure, such as, for instance, a compression of data that is stored in RAM 28 (box 58). Upon printer 20 reporting successful conclusion of the memory enhancement procedure, it is determined whether the data to be transferred to printer 20 is text, graphics or raster (decision box 60). If the data is either raster or graphics, the font pool is reduced by either the size of the raster or a graphics reduction parameter, as the case may be (boxes 62, 64). Thereafter, if a memory out condition or memory low condition is still signaled by printer 20, then the procedure exits (decision box 66). If a memory low/memory out condition is not signaled (decision box 66), a download action then occurs (box 68) and the process recycles. Further, if decision box 60 determines that the data is text, a download action occurs, assuming success of the memory enhancement procedure, and the procedure recycles and continues.

Returning to decision box 52, if it is determined that the incoming data segment is not text, it is next determined whether the graphics/raster memory has been used up (decision box 64). If no, a download is commanded and the procedure recycles (box 68). If yes and the data segment is determined to be indicative of graphics data (decision box 72), a command is issued to printer 20 to reduce the amount of memory allocated to font cache 30 by a pre-set amount, determined by a stored parameter (box 76). In a similar fashion, if the incoming data segment is found to be indicative of a raster image, then a command is issued to printer 20 to reduce the size of font cache 30 in accordance with the size of the raster image (box 78). If, in either case, a memory out or memory low condition occurs (decision box 56), the memory enhancement procedure (box 58) is commanded and the procedure continues as above described.

In such manner, the amount of memory allocated for use as a font cache in printer 20 is dynamically adjusted in accordance with the text/graphics/raster images on the document being printed. The possibility of preallocated, but unused memory is greatly reduced and substantial additional memory is made available for utilization by printer 20.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for adaptively allocating memory in a printer for storage of font data, said printer connected to a host processor, said host processor performing the method comprising the steps of:

a) controlling said printer to allocate an initial portion of cache memory for storage of font data and to maintain track of allocations of said cache memory by said printer;

b) analyzing a current data segment to be sent to the printer to determine if said current data segment is indicative of a font character to be printed or graphics data or raster data;

c) if said current data segment is found to be indicative of a font character, determining if said printer includes corresponding font character data, and if said printer does not include said corresponding font character data and does not have sufficient cache memory remaining for storage of said corresponding font character data indicated by said current data segment, instructing said printer to allocate an additional memory portion for storage of at least said corresponding font character data; and d) further instructing said printer to re-allocate portions of said memory allocated to storage of font character data if either graphics-related data or raster image data are determined to be sent to the printer and to cause said printer to reduce the cache memory allocated to storage of font data to make a portion of said cache memory available for said graphics related data or raster image data if insufficient memory is available therefor.

2. The method as recited in claim 1, further comprising the steps of:

e) converting data from a font memory into a raster-arranged image of font character data indicated by said current data segment; and f) transmitting said raster-arranged image to said printer for storage in a portion of cache memory allocated for storage thereof by step c).

3. A system for adaptively allocating memory in a printer to enable storage of font character data, said system comprising:

a printer including a random access memory and a processing unit for enabling allocation of storage areas within said random access memory;

a host processor connected to said printer and including a random access memory for containing code segments indicative of a document to be transmitted to said printer for rendering onto a media sheet;

a font character memory;

a graphics interface for converting font characters from said font character memory into a raster-arranged character data set; and printer driver means for transmitting data to said printer, said printer driver means including means for analyzing data segments from said random access memory which includes said document, for maintaining track of allocations of said random access memory by said printer and for issuing commands to said printer to alter allocations of said random access memory therein in accordance with a determined data segment of said received data segments, said printer driver means responsive to a current data segment being indicative of graphics related data or raster data, to cause said printer to reduce the random access memory allocated to storage of font data so as to make a portion of said random access memory available for said graphics related data or raster image data, as the case may be.

4. The system as recited in claim 3, wherein said printer driver means converts data from said font character memory into a raster-arranged image of font character data indicated by a current data segment, and transmits said raster-arranged image to said printer for storage in a portion of random access memory allocated for storage thereof.

5. The system as recited in claim 1, wherein said host processor and printer driver means are operative during processing of a page of media text, to continuously determine if a re-allocation of said random access memory is required.

* * * * *